United States Patent [19]

Hirschauer et al.

[11] Patent Number: 5,515,082
[45] Date of Patent: May 7, 1996

[54] DEVICE FOR SELECTIVELY DISPLAYING TEXT RECEIVED FROM A HIGH-SPEED COMMUNICATION

[75] Inventors: Karl P. Hirschauer, Tallman, N.Y.; Arthur A. Smith, Stamford; Leonard Ances, Westport, both of Conn.

[73] Assignee: Trans-Lux Corporation, Norwalk, Conn.

[21] Appl. No.: 255,474

[22] Filed: Jun. 8, 1994

[51] Int. Cl.$^6$ ............................................. G09G 5/22
[52] U.S. Cl. .................. 345/192; 345/141; 395/115; 395/144; 395/164
[58] Field of Search .................... 345/25, 141, 192, 345/193, 26; 395/144, 145, 115, 116, 164; 364/419.1

[56] References Cited

U.S. PATENT DOCUMENTS

3,656,148  4/1972  Belcher ........................ 345/26
5,185,858  2/1993  Emery ........................... 395/158
5,261,039  11/1993  Miyazaki ...................... 395/144
5,297,031  3/1994  Gutterman ................... 364/408
5,377,311  12/1994  Carlock ........................ 395/114

*Primary Examiner*—Richard Hjerpe
*Assistant Examiner*—Kent Chang
*Attorney, Agent, or Firm*—Kane, Dalsimer, Sullivan, Kurucz, Levy, Eisele & Richard

[57] ABSTRACT

An apparatus for receiving high-speed bursts of input news-type text data and displaying this data on a low-speed LED matrix display is disclosed. The input data is placed into one of two circular input buffers, one buffer is for regular stories and the other buffer is for "flash" or particularly important stories. The stories in the flash buffer are displayed prior to regular stories with several modes of interrupting available. When the contents of the buffers reach a first certain predetermined limit, paragraphs subsequent to the first paragraph of stories are discarded prior to display. Likewise, when the contents of the buffers reach a second certain predetermined limit, all paragraphs of the stories are discarded prior to display and only the headline is displayed.

8 Claims, 6 Drawing Sheets

DEVICE FOR SELECTIVELY DISPLAYING TEXT RECEIVED FROM A HIGH-SPEED COMMUNICATION

BACKGROUND OF THE INVENTION

1. Field of the Invention.

This invention pertains to the selective display of text data, particularly news-type data, which is received at a high rate and displayed at a low rate.

2. Description of the Prior Art

It is well-known in the prior art to provide a data feed including text data to broadcast news-type data. Advances in communications technology have allowed the data rate for such broadcasts to be very high. For instance, the Dow Jones® news service typically broadcasts at 9600 baud. Future advances in communications technology can certainly be expected to increase this rate even further.

However, display rates for such data are limited by the bounds of human perception and must be limited to the comprehension rate of a typical reader. This is particularly true for large-scale LED (light-emitting diode) displays, such as disclosed in U.S. Pat. No. 4,682,162, marketed by the assignee of the present application under the name DataJet®. A typical data communication rate as received by such a display is 300 baud.

As the news-data transmitted over a data feed is not continuous, that is, there are periods of high-speed transmission ("bursts") interspersed with periods of null or no transmission, the problem of the data transmission rates being higher than human comprehension rates can be alleviated by the use of a buffer. The buffer then stores the news-type data which eventually is sequentially displayed and subsequently discarded. However, this simple approach is not adequate during times of frequent news-type data transmission where the data buffer would simply overflow and data would be lost.

Moreover, such a simple buffering approach would lose data during times of frequent data transmission based substantially entirely upon the chronology of recent transmission and would not be able to distinguish between more important news stories and less important news stories.

Similarly, even during routine display within the capacity and capability of such a simple buffering system, no distinction is made between more important news stories and less important news stories, and more important news stories would wait until all previously transmitted less important news stories were sequentially displayed.

OBJECTS AND SUMMARY OF THE INVENTION

It is therefore an object of this invention to display text data, particularly news-type data, at a lower data rate than the data rate of the received "bursts" of data from a communications data link.

It is therefore a further object of this invention to buffer incoming text data, particularly news-type data, without random data losses due to buffer overflow.

It is therefore a still further object of this invention to recognize news-type data of higher priority, which is displayed ahead of its normal chronological sequence.

These and other objects are achieved by a device which includes two buffers, one for the text of "regular" news-type data, and another for the text of "flash" or higher priority news-type data. The distinction between these levels of priority is provided by a flag which is set according to a determination at the service providing the news-type text data stream.

The news-type data stream is organized by articles or stories such as is provided by the Dow Jones Financial News Services®, including Dow Jones News Service, Capital Markets Report, International Petroleum Report, World Equities Report, Professional Investor Report and International News Services (including the Banking Report). Each article has a headline or title and possibly one or more paragraphs, or tabulated data. Stories in the higher priority "flash" buffer are displayed ahead of stories in the "regular" buffer. This can be done in an "Interrupt at End of Story Mode" wherein the highest priority story in the "flash" buffer will wait until the current regular story is completed (subject to the format limitations described herein below) and then the highest priority story in the "flash" buffer will be displayed. Alternately, this can be done in an "Interrupt at End of Paragraph or Headline" mode wherein the "flash" story will not be displayed until the paragraph or headline from the "regular" story currently being displayed is finished. Lastly, a "No Interrupt" mode may be chosen wherein the "flash" story is treated the same as a regular story and will be displayed in the same sequence as received.

Stories in the "flash" buffer are queued so that a "flash" story never interrupts another "flash" story, regardless of which of the three above modes is chosen.

Ordinarily, the news-type data stream is displayed in full with the headline and all paragraphs displayed (and, typically, a time/date stamp is additionally displayed). However, the data content of buffers is monitored. When the time required to display the total amount of buffered data at the given display rate exceeds a first predetermined limit, then the system displays only the headline, the time/date stamp and the first paragraph of each story (up to a maximum of ten lines, and discards subsequent paragraphs of the story) until the time required to display the total amount of buffered data does not exceed the first predetermined limit.

Likewise, when the time required to display the total amount of buffered data at the given display rate exceeds a second predetermined limit (typically greater than the first predetermined limit), then the system displays only the headlines and the time/date stamp of each story (and discards all paragraphs of the story) until the time required to display the total amount of buffered data does not exceed the second predetermined limit.

The first and second predetermined limits can be set lower than required by purely hardware considerations for at least two reasons—firstly, these limits can be set artificially low in order to keep the displayed news stories current; secondly, these limits can be set to zero to force the apparatus into a headline only or headline plus first paragraph only mode.

Additional user-selectable options to be described in detail hereinafter include display line character width and locked capital letter (caps lock) mode.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
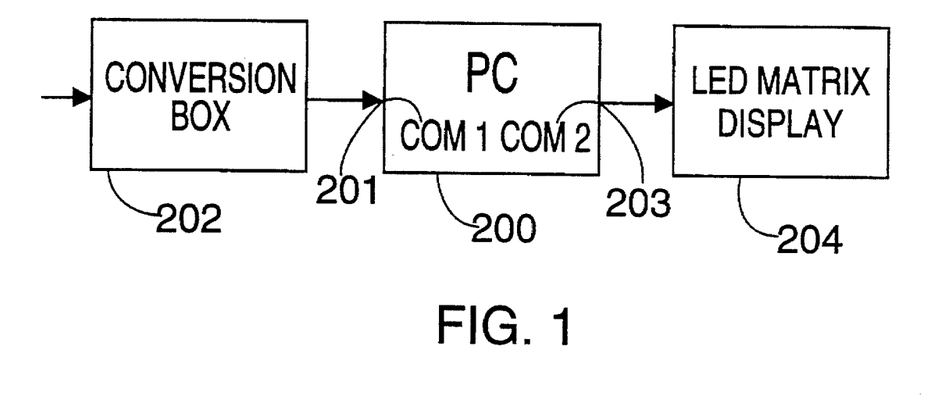
FIG. 1 is a block diagram of the apparatus of the present invention.

Referring now to the drawings in detail wherein like numerals indicate like elements throughout the several views, one sees that FIG. 1 is a high-level hardware schematic diagram of the present invention. A personal computer (IBM/PC, XT, AT, PS/2 or compatible computer running Dos 3.2 or better, 640K RAM, at least a monochrome CRT, two RS232 serial 'communication' ports, hard drive and floppy drive) 200 is illustrated, but those skilled in the art will realize that other computers are equally applicable. PC 200 receives the text news-type data via input serial (communication or COM1) port 201 and conversion box 202 (such as Dow Jones® decoder box). The Dow Jones News Service typically communicates at 9600 baud and may, in the future, communicate at higher rates. The programs included in PC 200 implement the algorithms illustrated in the following figures. Instructions from PC 200 are output via output serial (communication or COM2) port 203, typically at 300 baud, to LED (light-emitting diode) matrix display 204, such as is disclosed in such as disclosed in U.S. Pat. No. 4,682,162, marketed by the assignee of the present application under the name DataJet®. A similar NewsJet® can also be used.

Figure 2:
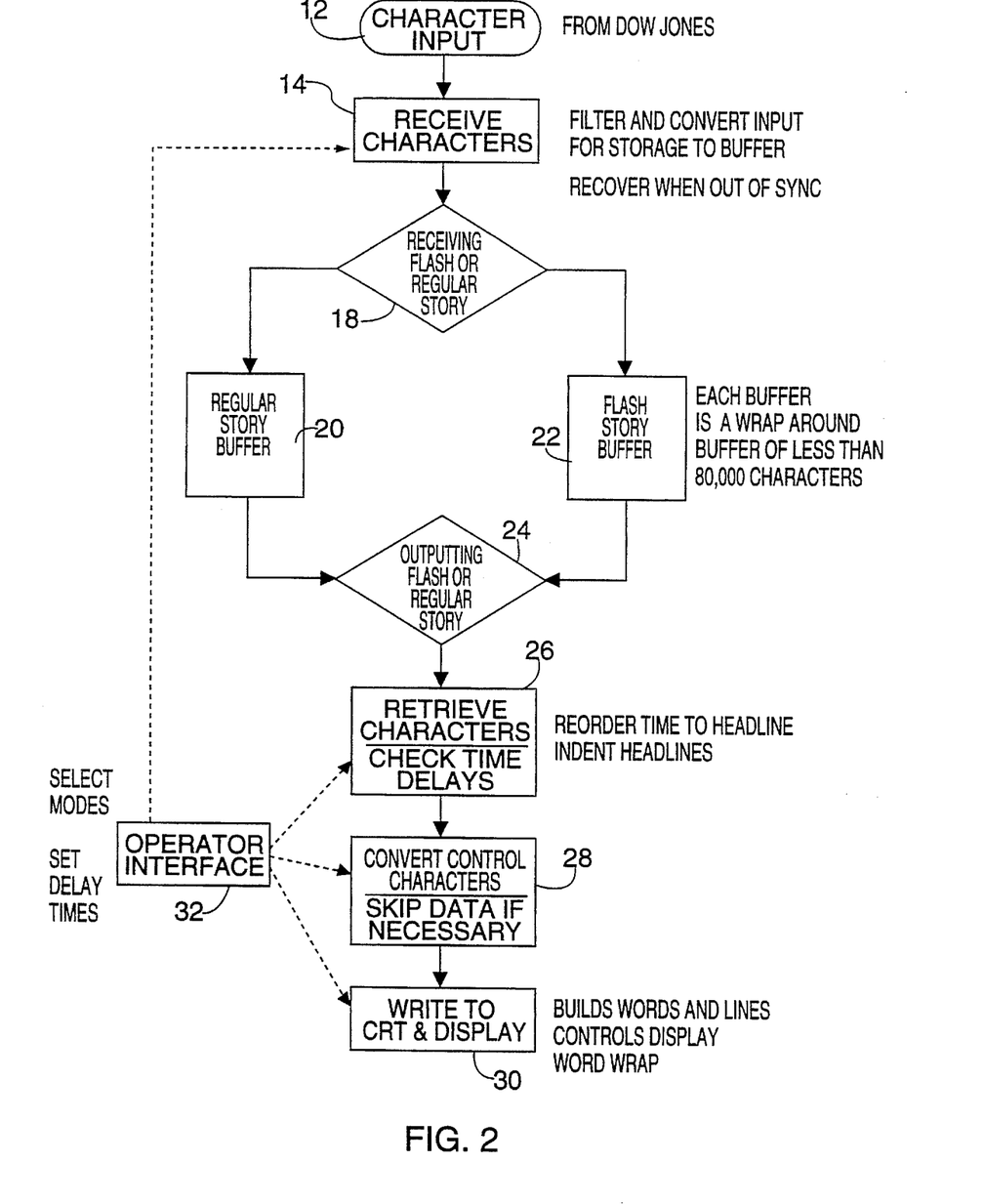
FIG. 2 is a flowchart of an overview of the apparatus of the present invention.

As shown in FIG. 2, data is input from the character input block 12 and received by the receive characters block 14. The receive characters block 14, which is illustrated in more detail in FIG. 3, filters and converts the input for storage into the regular story buffer 20 or the flash story buffer 22 and further includes the capability to recover when the data is out of sync.

For instance, the input data may have the following format:

```
[16][16][01]t(four digit story number[1F]-----[0A] r(or f for flash
story)f[13][11](text Slugline)[0D][0A][02](-------- Text Headline
----------)[0D][0A][09][0D][0A][09](-------------------------------
--------------------------First Paragraph-----------------------
------------------------------------------------------------------
)[0D][0A][09](----------------------------------------------------
---------------------Second Paragraph---------------------------
----------------------------)[0D][0A][09](for as many paragraphs
as needed)[0A][09](---------------Text Tag Line---------------)[0D]
[0A][09](---Time---)[0D][0A][03](----Time & Date---)[04](NEXT
STORY FOLLOWS)
```

The input is received as shown above and filtered into either the regular story buffer 20, or the flash story buffer 22 based on the "r" or "f" following the first [0A] after the [16] (beginning of story) as determined by block 18. Both buffers are circular buffers defined as being 80,000 characters long.

The filtered content of the buffers is shown below:

```
[16](---------------Text Headline-----------------)[02](---------
-------------------------------------------------------------
---------------------First Paragraph---------------------------
--------------)[0D](------------------------------------------
------------------------------Second Paragraph------------------
----------------)[0D](For as many paragraphs as needed) [0D][03](Time
and Date---------------)[04](NEXT STORY FOLLOWS).
```

Wherein hexadecimal [16] indicates the start the headline of a story, hexadecimal [02] indicates the end of a headline and the start of the first paragraph, hexadecimal [0D] represents a carriage return/line feed such as separates paragraphs, hexadecimal [03] indicates the start of the time and date stamp and hexadecimal [04] represents the end of a story.

Block 24 retrieves data from buffer 20 or 22, giving priority to data in flash story buffer 22 over data in regular story buffer 20 when required. As previously described, this can be done in an "Interrupt at End of Story Mode" wherein the highest priority story in the flash story buffer 22 will wait until the current regular story is completed and then the highest priority story in the flash story buffer 22 will be displayed. Alternately, this can be done in an "Interrupt at End of Paragraph or Headline" mode wherein the "flash" story will not be displayed until the paragraph or headline from the "regular" story currently being displayed is finished. Lastly, a "No Interrupt" mode may be chosen wherein the "flash" story is treated the same as a regular story and placed in the regular story buffer.

Figures 4, 4A:
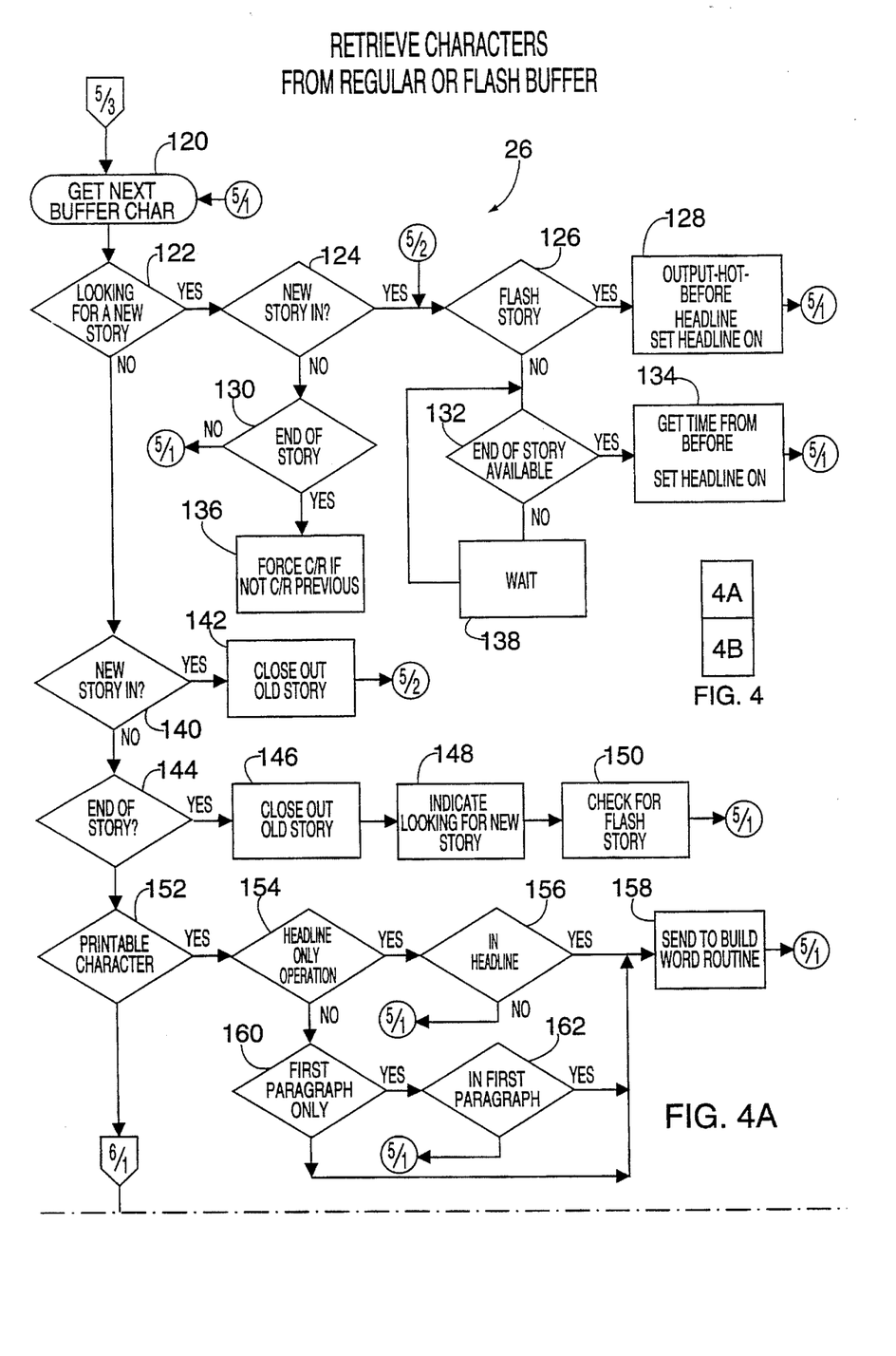
FIG. 4 is a flowchart of the algorithm for retrieving characters from the buffers of the apparatus of the present invention.
Figure 4B:
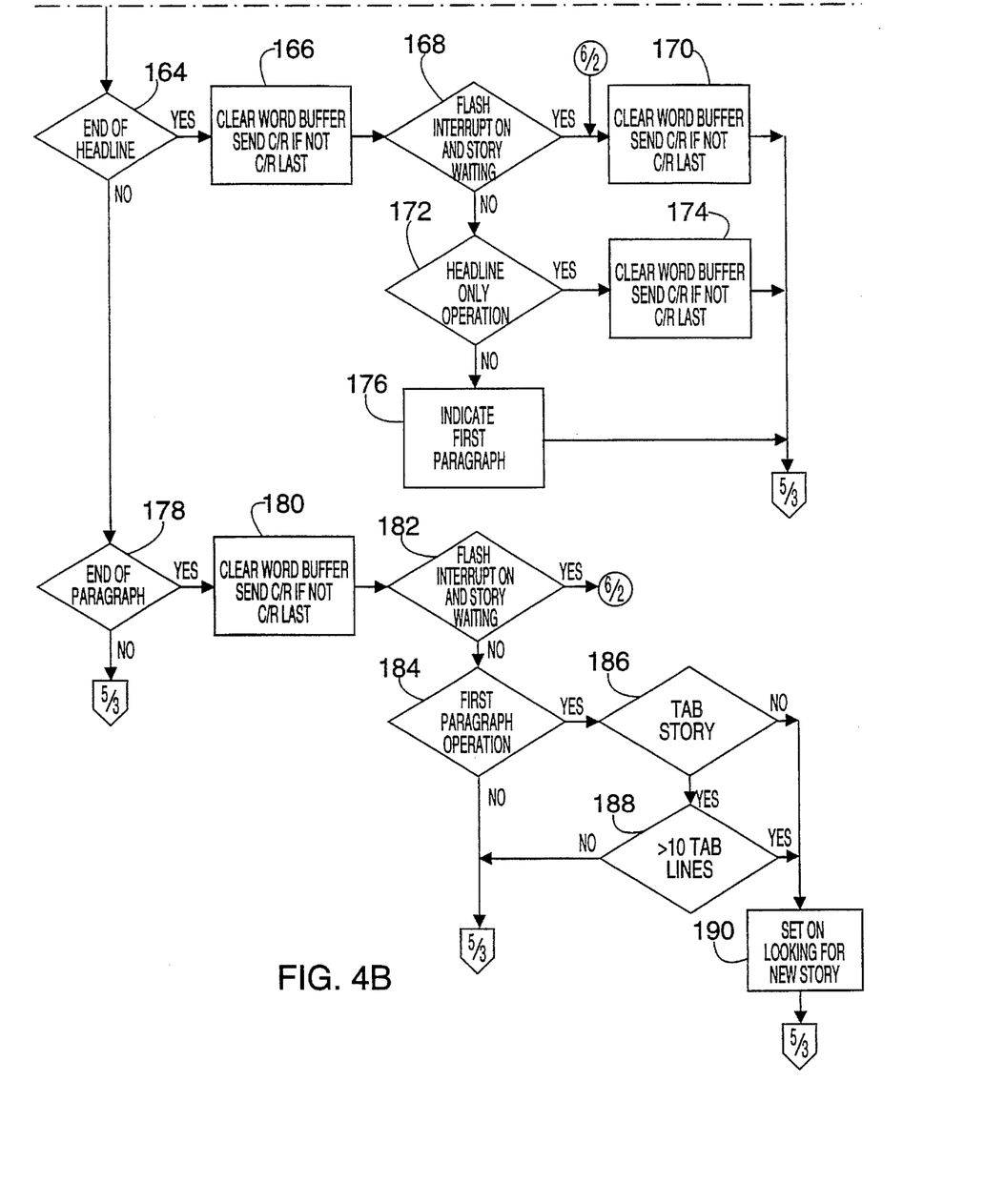

Retrieve character block 26, as further illustrated in FIG. 4, checks the time delays, reorders the time to display to the headline, and indents the headline.

Conversion block 28 converts the control characters and skips data as necessary. Display block 30 builds words and lines and controls the display word wrap in order to write the resulting data to the CRT of the PC 200 and the LED matrix display 204. Blocks 26, 28, and 30, as well as 14 receive instructions from the operator interface 32 (typically including the keyboard or other input devices of PC 200) such as selecting the various modes and time delays for operation of the apparatus. For instance, this operator-input data includes the way in which a flash story interrupts a regular story, the amount (measured in display time) of backlogged data which will be received before the apparatus goes into either a "first paragraph only" or "headline only" mode, a "caps/lock" (which can instruct that all data on the LED matrix display be displayed in capital letters) and the display line character width of LED display matrix display 204.

As those skilled in the art will realize, such a user interface may be easy for one to operate if menus are displayed upon the pushing of the "ALT" key and a letter key. For instance, ALT-D may be used to display the "delay" times menu.

Figures 3, 3A:
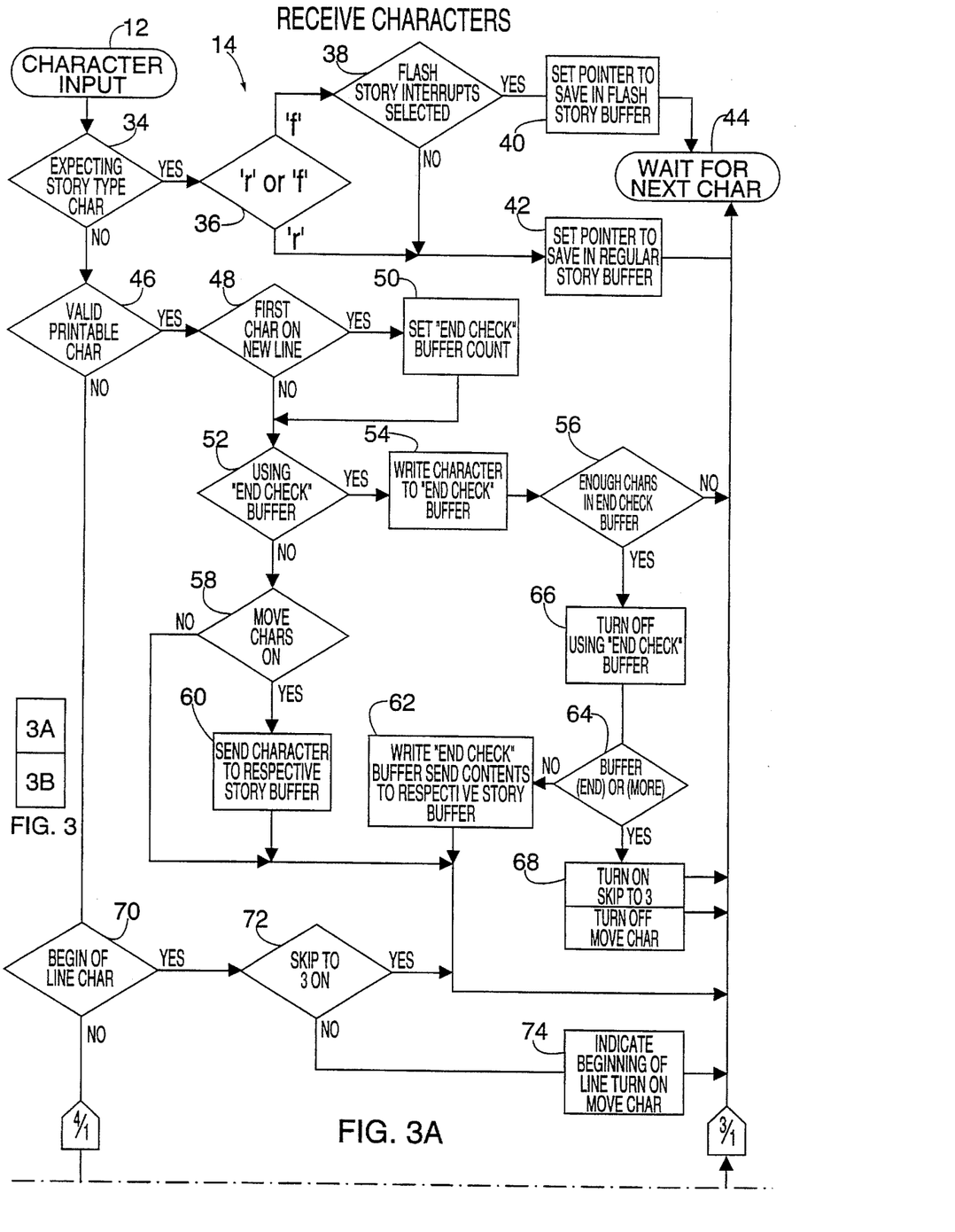
FIG. 3 is a flowchart of the algorithm for receiving characters in the apparatus of the present invention.
Figure 3B:
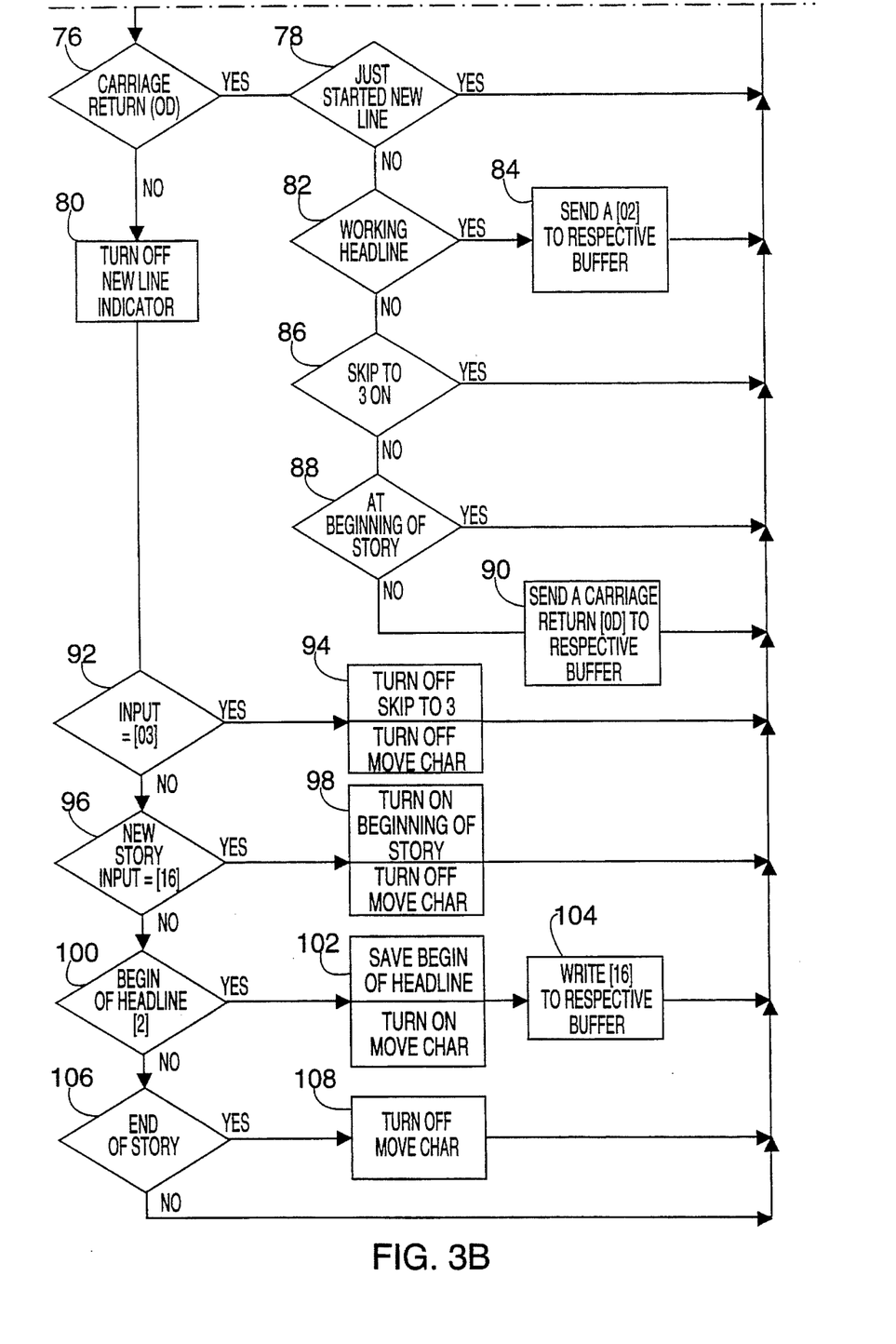

Referring now to FIG. 3, one sees that characters are input through block 12 and received through block 14. Block 14 first includes decision block 34 to decide if the input character is expected to determine the story type (regular or flash).

If decision block 34 determines that the input character is expected to determine the story type, then the input character is used by block 36 to determine the story type. If the story is a flash story, the flash story mode is determined by block 38 and the pointer to either the (circular) flash story buffer 22 or regular story buffer 20 is set by blocks 40 or 42 and the apparatus waits for the next character (block 44, with an implicit jump to block 12. If the story is a regular story, the pointer to the (circular) regular story buffer is set by block 42 and the apparatus waits for the next character via block 44.

If decision block 34 determines that the input character is not expected to determine the story type, then block 46 determines if the character is a text character or a control character. If the input character is a text character, blocks 48 through 68 add the text character to the buffer 20 or 22 as appropriate and build the lines.

If block 46 determines that the input character is a control character, then the input character is checked sequentially if it is any of the following control characters and appropriate action is taken before returning to block 44:

1. A beginning of line character (block 70), if so, block 72 and, if appropriate, block 74 execute.

2. A carriage return character (block 76), if so, blocks 78, 82, 86, and/or 88 determine the characteristic and environment of the carriage return. Blocks 82 and 88 can effect the execution of blocks 84 and 90, respectively. If the character is not a carriage return, block 80 is executed.

3. A [03] control character indicating that the day/date stamp follows in the incoming signal (block 92), if so, block 94 is executed.

4. A [16] control character indicating that a new story follows in the incoming signal (block 96), if so, block 98 is executed.

5. A [02] control character indicating that the headline follows in the incoming signal (block 100), if so, blocks 102 and 104 are executed.

6. A [04] control character indicating that the story has ended (block 106), if so block 108 is executed.

Referring now to FIG. 4, one sees the flowchart of retrieve character block 26.

Block 120 retrieves the next buffer character. If the apparatus is looking for a new story (block 122), and a new story is found (block 124), it is determined whether or not the story is a flash story (block 126). If the story is a flash story, block 128 setting the headline on and setting the flash mode is executed and a return is executed to block 120 to retrieve the subsequent character. If no new story is found, it is determined whether or not the end of story character code has been read, if yes, a carriage control is executed if none has been previously executed, if no, execution is returned to block 120. If a new story is found but the story is not a flash story, blocks 132 and 138 execute until an end of story is available, then the previous time and the headline mode is set on block 134 and execution is returned to block 120.

If the apparatus is not looking for a new story (block 122) and a new story is in (block 140), the old story is closed out (block 142) and execution is returned to block 126. If a new story is not in (block 140), and the end of story is determined (block 144), then the old story is closed out (block 146), an indicator is set for looking for a new story (block 148), the story is checked for flash status (block 150) and execution is returned to block 120.

If the end of story is not determined (block 144) and a printable character is detected (block 152), blocks 154–160 are executed as appropriate, depending upon the mode, to prepare the output data for the LED matrix display 204.

If a printable character is not determined (block 152), then the apparatus checks for end of headline (block 164). If an end of headline is detected, blocks 166–176 are executed as appropriate depending upon the mode set for the apparatus (headline only, headline plus first paragraph, or full text mode).

If an end of headline is not detected (block 164) but an end of paragraph is determined (block 178), then blocks 180–190 are executed as appropriate depending upon the mode set for the apparatus (wherein only the first ten lines are printed in the headline plus first paragraph mode if the text is in tabular form, see block 186 and 188).

To operate the apparatus, the user sets up the apparatus as shown in FIG. 1, sets the various desired and appropriate options via operator interface 32, and selects the desired data stream input for display.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. Apparatus including:

means for receiving a text data stream at a first data rate, said text data stream including intermittent communications, said communications including a title and subsequent text organized by paragraph, said communications further including a priority flag;

buffer means for receiving said text data stream;

means for sequentially displaying said text data stream at a second data rate, said second data rate being less than said first data rate, wherein said means for sequentially displaying receives said text data stream from said buffer means;

means for determining if said priority flag is set for each said communication;

means for advancing priority of a communication responsive to said means for determining whereby a communication with said priority flag set is advanced in sequence from said buffer means to said means for sequentially displaying;

first means for ascertaining if contents of said buffer means has exceeded a first threshold, said first threshold being based upon time required for said means for sequentially displaying to display contents of said buffer means;

second means for ascertaining if contents of said buffer means has exceeded a second threshold, said second threshold being based upon time required for said means for sequentially displaying to display contents of said buffer means;

means for discarding text data within said intermittent communications subsequent to a first of said paragraphs when said buffer means has exceeded said first threshold as determined by said first means for ascertaining, prior to sending of said text data from said buffer means to said means for sequentially displaying; and means for discarding text data within said intermittent communications subsequent to said title when said buffer means has exceeded said second threshold as determined by said second means for ascertaining, prior to sending of said text data from said buffer means to said means for sequentially displaying.

2. The apparatus of claim 1 wherein said buffer means includes a first sub-buffer means for receiving portions of said text data stream associated with an "on" condition of said priority flag and second sub-buffer means for receiving portions of said text data stream associated with an "off" condition of said priority flag.

3. The apparatus of claim 2 wherein said first and second sub-buffer means comprise circular buffers.

4. The apparatus of claim 2 further including operator interface means whereby a user can change said first and second thresholds.

5. The apparatus of claim 4 wherein said operator interface means allows a user to input said first and second thresholds based on total time required to display the data in said buffer means.

6. The apparatus of claim 4 wherein said means for advancing priority of a communication determines if said first sub-buffer means includes data and, if data is found, responsive to a flag set by a user via said operator interface means, responds in a way chosen from the group consisting immediately interrupting communication of text data from said second sub-buffer means to said means for sequentially displaying and communicating text data from said first sub-buffer means to said means for sequentially displaying; allowing text data communicating from said second sub-buffer means to said means for sequentially displaying to finish a paragraph and then interrupting communication of text data from said second sub-buffer means to said means for sequentially displaying and communicating text data from said first sub-buffer means to said means for sequentially displaying; and communicating text from said first and, second sub-buffer means to said means for sequentially displaying in chronological order which said intermittent communications were received.

7. The apparatus of claim 4 wherein said paragraphs of said text data stream are separated by carriage return control characters.

8. The apparatus of claim 4 wherein said intermittent communications within said received text data stream include a time/date stamp and wherein said time/date stamp is displayed on said means for sequentially displaying.

* * * * *